May 31, 1932.  H. S. EBERHARD  1,860,531
TANK SUPPORT ON MOTOR VEHICLES
Filed May 8, 1929
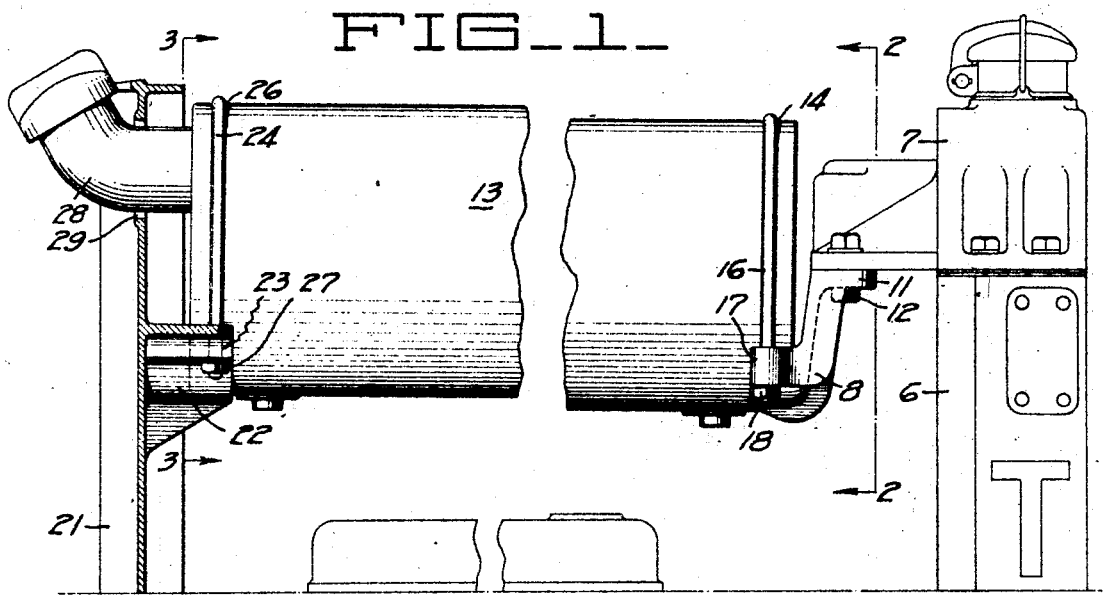
FIG_1_
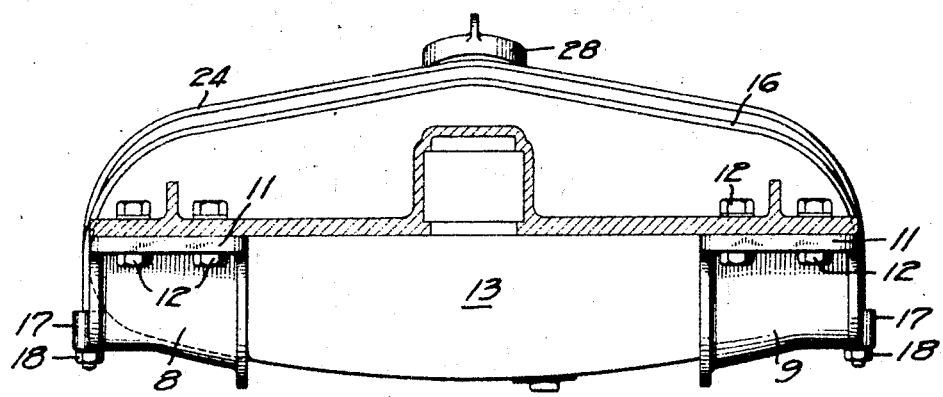
FIG_2_
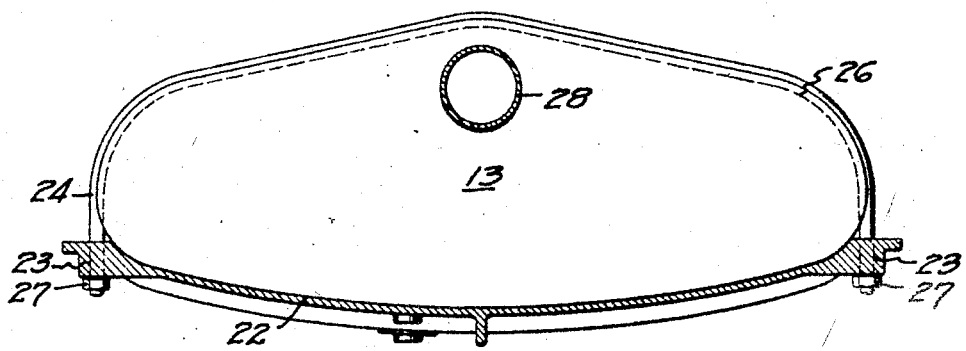
FIG_3_
INVENTOR
*Harmon S. Eberhard*
BY
*White, Prost & Fryer*
ATTORNEYS Patented May 31, 1932

1,860,531

UNITED STATES PATENT OFFICE

HARMON S. EBERHARD, OF SAN LEANDRO, CALIFORNIA, ASSIGNOR TO CATERPILLAR TRACTOR CO., OF SAN LEANDRO, CALIFORNIA, A CORPORATION OF CALIFORNIA

TANK SUPPORT ON MOTOR VEHICLES

Application filed May 8, 1929. Serial No. 361,426.

My invention relates particularly to fuel tanks and their method of attachment and support on vehicles. The device of my invention is especially applicable to tractors in which an extremely rugged and rigid construction is necessary and in which it is desirable to reduce the number of separate parts to a minimum.

It is an object of my invention to provide a relatively rigid tank support.

Another object of my invention is to provide a tank support with the utilization of a minimum number of parts.

The foregoing and other objects are attained in the embodiment of the invention shown in the drawings, in which Figure 1 is a side elevation, a portion being in section, of the tank support of my invention incorporated in a tractor.

Figure 2 is a cross section of the device as shown in Figure 1, the plane of section being indicated by line 2—2 of Figure 1.

Figure 3 is a cross section of the device shown in Figure 1, the plane of section being indicated by line 3—3 of Figure 1.

In its preferred form, the tank support of my invention preferably comprises a grooved fuel tank supported between brackets attached to a dash and to a radiator of a tractor, the tank being cradled on the brackets and held rigidly thereto by rods engaging the grooves in the tank and passing through the brackets to form a substantially inflexible unit.

As disclosed in the drawings, the tractor is provided with a radiator 6 terminating in a header 7 to which are removably secured a pair of brackets 8 and 9. Each of these brackets is provided with an offset 11 at its upper end to receive fastening means 12 for detachably securing the brackets to the radiator 6. The lower end of each bracket is likewise offset but in an opposite direction to form a support for the fuel tank 13. In the present instance, the tank is of flattened oblate cross section and the brackets 8 and 9 are preferably contoured to conform thereto. The leading end of the tank is preferably provided with a circumferential groove 14 adapted to receive a circular rod 16 extending over the upper end of the tank and terminating in depending portions passing through apertures in the outer portions 17 of brackets 8 and 9. The lower ends of rods 16 are threaded to receive nuts 18 which when tightened firmly secure the forward end of tank 13 to the brackets 8 and 9.

At a convenient distance from the radiator 6 the tractor is provided with a dash 21 which preferably is of cast metal and is formed below its upper edge with an integral bracket 22. The bracket extends substantially across the dash and is shaped to fit the lower contour of the fuel tank 13.

At its ends the bracket is provided with apertures 23 to receive the depending ends of a rod 24 passing over the upper portion of tank 13 and seated in a suitable groove 26 therein. The lower ends of rod 24 are provided with nuts 27 for tensioning the rod against the tank and holding the tank 13 firmly seated in the bracket 22. The rear end of the tank is provided with a filler spout 28 passing through a suitable aperture 29 formed in the dash 21 and provided with sufficient clearance to permit withdrawal of the spout 28 upon release of the clamping rods 16 and 24.

It will be appreciated that with the construction of my invention the tank 13 is supported and cradled between brackets on the radiator and a bracket on the dash in such a manner that relative movement between the various parts is precluded and the radiator tank and dash form a substantially rigid unit. This, therefore, does away with straps and braces for holding the dash with respect to the radiator and also provides a convenient and strong support for the tank. Nevertheless, the tank can easily and quickly be dismantled and removed from the tractor.

It is to be understood that I do not limit myself to the form of the tank support shown and described herein, as the invention, as set forth in the following claims may be embodied in a plurality of forms.

I claim:
1. A tank support comprising a radiator, a pair of detachable brackets depending from said radiator, a dash, a bracket integral with said dash, a tank having circumferential grooves cradled in said brackets, and rods seated in said grooves and secured to said brackets for constraining said tank and said brackets against relative movement.

2. A tank support comprising a radiator, a pair of detachable brackets depending from opposite sides of said radiator, an apertured dash, an integral bracket extending substantially across said dash, a grooved tank cradled in said brackets, a spout on said tank projecting through said aperture, and rods engaging the grooves in said tank and said brackets whereby said dash, radiator and tank are secured together as a unit.

In testimony whereof, I have hereunto set my hand.

HARMON S. EBERHARD.